(12) United States Patent  
Goldstein

(10) Patent No.: US 7,647,179 B2  
(45) Date of Patent: Jan. 12, 2010

(54) SYSTEM AND METHOD FOR COORDINATE MAPPING ONTO AIRPORT DIAGRAMS

(76) Inventor: Hilton Goldstein, 6205 Balderstone Dr., San Jose, CA (US) 95120

( * ) Notice: Subject to any disclaimer, the term of this patent is extended or adjusted under 35 U.S.C. 154(b) by 676 days.

(21) Appl. No.: 11/511,574

(22) Filed: Aug. 29, 2006

(65) Prior Publication Data

US 2007/0112517 A1    May 17, 2007

Related U.S. Application Data

(60) Provisional application No. 60/713,519, filed on Aug. 31, 2005.

(51) Int. Cl.
    *G01S 13/56* (2006.01)
(52) U.S. Cl. .................... 701/301; 345/619
(58) Field of Classification Search .......... 701/301, 701/4, 16, 120, 207, 214, 300; 342/450, 342/454; 244/114 R; 340/947, 951, 961, 340/949, 970; 345/619; 455/431
See application file for complete search history.

(56) References Cited

U.S. PATENT DOCUMENTS

| 3,706,969 | A | * | 12/1972 | Paredes | 340/989 |
| 5,343,395 | A | * | 8/1994 | Watts | 701/16 |
| 6,240,341 | B1 | * | 5/2001 | Snyder | 701/3 |
| 6,731,226 | B2 | * | 5/2004 | Walter | 340/972 |

* cited by examiner

*Primary Examiner*—Dalena Tran

(57) ABSTRACT

A bounded diagram having latitude and longitude points is identified. Two lines of latitude and two lines of longitude contained within the bounded diagram are identified. The points of where the lines of latitude and the lines of longitude intersect with the boundary of the bounded diagram are determined. Two latitude connecting lines and two longitude connecting lines are determined from the intersection. A latitude coordinate and a longitude coordinate of a latitude/longitude point is obtained. Latitude and longitude points corresponding to the latitude and longitude coordinates are determined along each of the connecting lines. Latitude and longitude position lines are determined by the points along the connecting lines. An intersection point of the latitude position line and the longitude potion line is determined and an object representing the latitude/longitude point is placed at the intersection point.

20 Claims, 6 Drawing Sheets

Figure 3

SYSTEM AND METHOD FOR COORDINATE MAPPING ONTO AIRPORT DIAGRAMS

CROSS-REFERENCE TO RELATED APPLICATIONS

The present Utility patent application claims priority benefit of the U.S. provisional application for patent No. 60/713,519 filed on Aug. 31, 2005 under 35 U.S.C. 119(e). The contents of this related provisional application are incorporated herein by reference.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

FIELD OF THE INVENTION

The present invention related generally to mapping systems. More specifically, the invention relates to coordinate mapping systems for the location of objects on an airport diagram.

BACKGROUND OF THE INVENTION

Eliminating and/or reducing the number of Runway Incursions and Surface Incidents is a primary objective of the FAA and the NTSB. In fact, the world's worst commercial airline disaster occurred on a runway on Mar. 27, 1977. Numerous accidents have been caused because a pilot (or pilots) did not know their exact position, and sometimes aircraft taking off from taxiways. 43% of pilots responsible for runway incursions reported a temporary loss of positional awareness—FAA Runway Safety Report—August 2005.

Each runway has numbers painted on it that designate the 'runway name' and its approximate magnetic heading. For example, runway 31 is very closely aligned with a magnetic heading of 310°. These runway numbers help pilots taxiing or landing identify and verify the appropriate runway. Sometimes, however, these numbers can be located thousands of feet from a runway entry point and can often be located behind an aircraft taxiing onto a runway at a runway/taxiway intersection. These runway numbers are also difficult to see from a ground location other than directly in front of them. Runways are usually constructed from the same material as adjacent taxiways and it is almost impossible to distinguish where a runway meets a taxiway.

Airports often have a tremendous amount of signage and lighting to aid a pilot's situational awareness. Lighting and signage become progressively more difficult to see as the ambient light decreases at night and in bad visibility conditions. In some cases pilots have taken off from a taxiway adjacent to a runway thinking that they were on the runway. Incidents like these have resulted in accidents with the loss of life. Aircraft taxiing onto an active runway often results in the loss of separation of aircraft and a potentially very dangerous situation.

There are various technologies currently in service or being tested. Some solutions include having an airport layout definition database. However each time an airport layout is modified, taxiways or runways renamed, or lighting systems modified, this database must be updated. Moreover, since this database is aimed at commercial airliners, it only includes the larger airports that are serviced by the larger airlines. Other systems, for example the Ground Marker Program, require equipment on the airport surface that notifies aircraft when they physically activate them. These systems consist of any number of antennae, transmitters, inductive loops and computers. As the airport complexity increases, so too does the cost of the system because additional equipment needs to be placed at each additional location. Such devices are aimed at the 'situational awareness' of the pilot; i.e. having a pilot knowing their exact position on the airport. Each of the above-mentioned systems has a cost associated with them in updating the airport definition database, or the purchase and installation of transmitters in the airport and purchase and installation and maintenance of receivers in each and every aircraft. General Aviation pilots, who often do not have access to the above mentioned systems, perform most of the United States' take-offs and landings, and large airlines service only a small percentage of the nation's airports. Also, non-aircraft vehicles account for a non-trivial percentage of surface incidents. These vehicles do not carry advanced avionics, nor do they carry the 75 MHz equipment required for the Ground Marker Program.

Determining the location of other aircraft and vehicles can be extremely difficult and very often impossible in night and/or reduced visibility conditions. Low clouds, fog, haze, and other meteorological conditions can reduce visibility to very short distances. Reduced visibility becomes a serious problem for both pilots of aircraft and tower personel. Pilots need to know if there is an aircraft on or about to enter a runway, and Air Traffic Controllers need to be able to determine the location of aircraft and vehicles on and around the airport.

In view of the foregoing, there is a need for a system for improving a pilot's situational awareness and an Air Traffic Controller's awareness of the airport traffic that is desirably less costly than existing systems and, further, desirably available to smaller airports and general aviation pilots.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1, 2, and 3 are exemplary to scale FAA airport diagrams of three different airports. FIG. 1 is an airport diagram of San Francisco International Airport. FIG. 2 is an airport diagram of Reid-Hillview Airport. FIG. 3 is an airport diagram of Dallas-Fort Worth International Airport;

Figure 1:
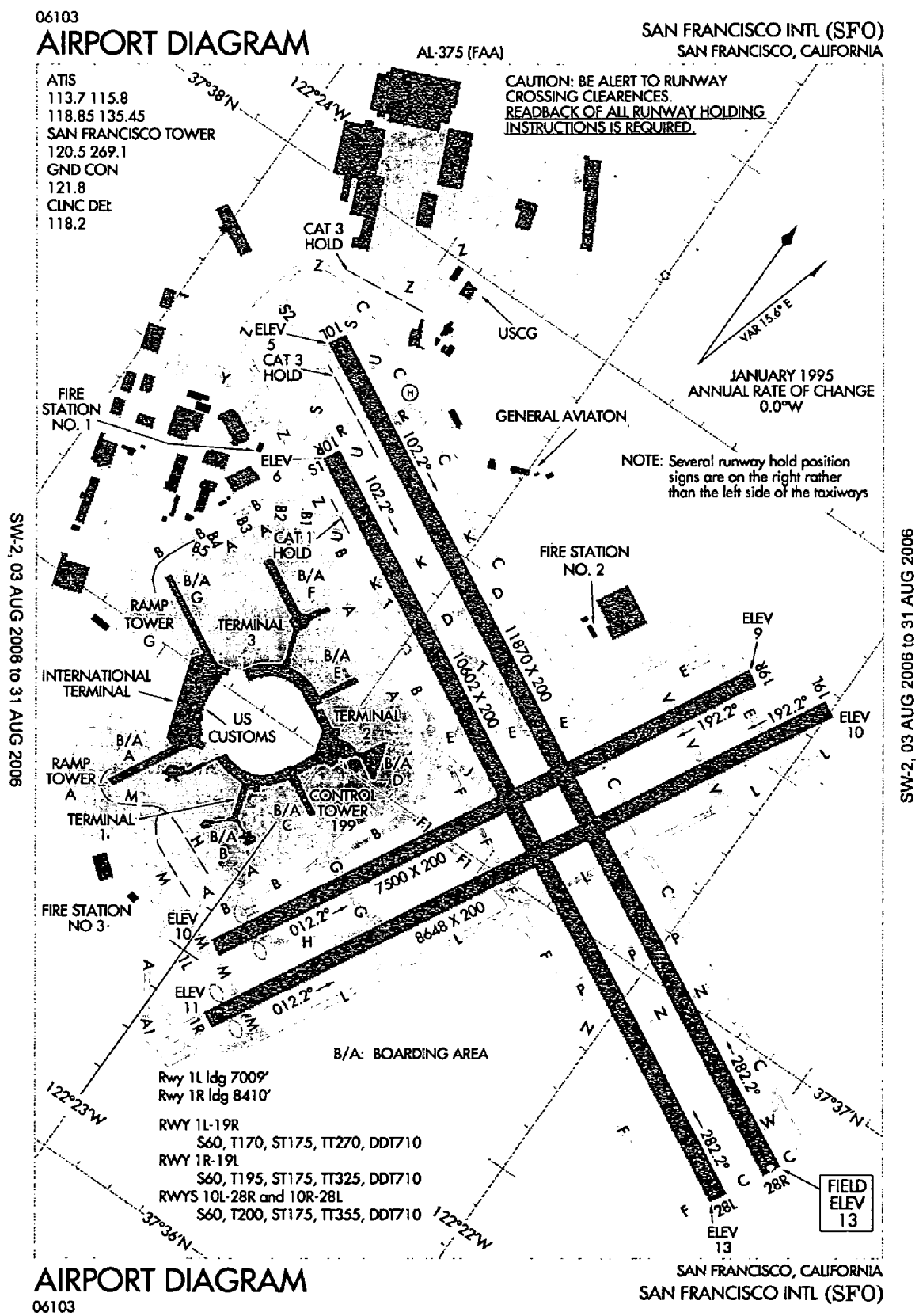

Unless otherwise indicated illustrations in the figures are not necessarily drawn to scale.

SUMMARY OF THE INVENTION

To achieve the forgoing and other objects and in accordance with the purpose of the invention, a technique for the mapping latitude/longitude points is described.

In one embodiment of the present invention, a bounded diagram having latitude and longitude points is identified. Two lines of latitude contained within the bounded diagram are identified. Two lines of longitude contained within the bounded diagram are also identified. The points of where the lines of latitude and the lines of longitude intersect with the boundary of the bounded diagram are determined. Two latitude connecting lines are determined from the intersection points such that each of the latitude connecting lines intersects the two lines of latitude. Two longitude connecting lines are determined from said intersection points such that each of the longitude connecting lines intersects the two lines of longitude. A latitude coordinate of the latitude/longitude point is obtained. Latitude points corresponding to the latitude coordinate are determined along each of the latitude connecting lines. A latitude position line is determined by the latitude points. A longitude coordinate of the latitude/longitude point is obtained. Longitude points corresponding to the longitude coordinate are determined along each of the longitude connecting lines. A longitude position line is determined by the longitude points. An intersection point of the latitude position line and the longitude position line is determined and an object representing the latitude/longitude point is placed at the intersection point.

In another embodiment, the bounded diagram is an airport diagram.

Yet other embodiments use non-linear calculations to determine the latitude points and the longitude points.

In another embodiment image processing is used on the bounded diagram and the object.

In still another embodiment, multiple latitude/longitude points are mapped.

In a further embodiment, placing the object initiates an alarm.

A method and software product are also provided that achieve some or all of the above identified steps or functions.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments.

In one aspect of the present invention, a system is provided that determines the position of a person or vehicle, with a significant degree of accuracy, relative to the airport's diagram and overlays a position marker on the airport diagram. Another aspect of the present invention is to significantly improve situational awareness even in low or zero visibility conditions thereby reducing the likelihood of accidents or incidents occurring in low or zero visibility conditions. By determining the actual position of the aircraft and overlaying an aircraft icon on the airport diagram, the pilot can clearly, easily, and quickly determine the exact location of the aircraft on the runway/taxiway structure. Therefore, even in low or zero visibility conditions, the pilot would know their exact location as well as the position of other aircraft and vehicles on or near the airport surface.

Figure 2:
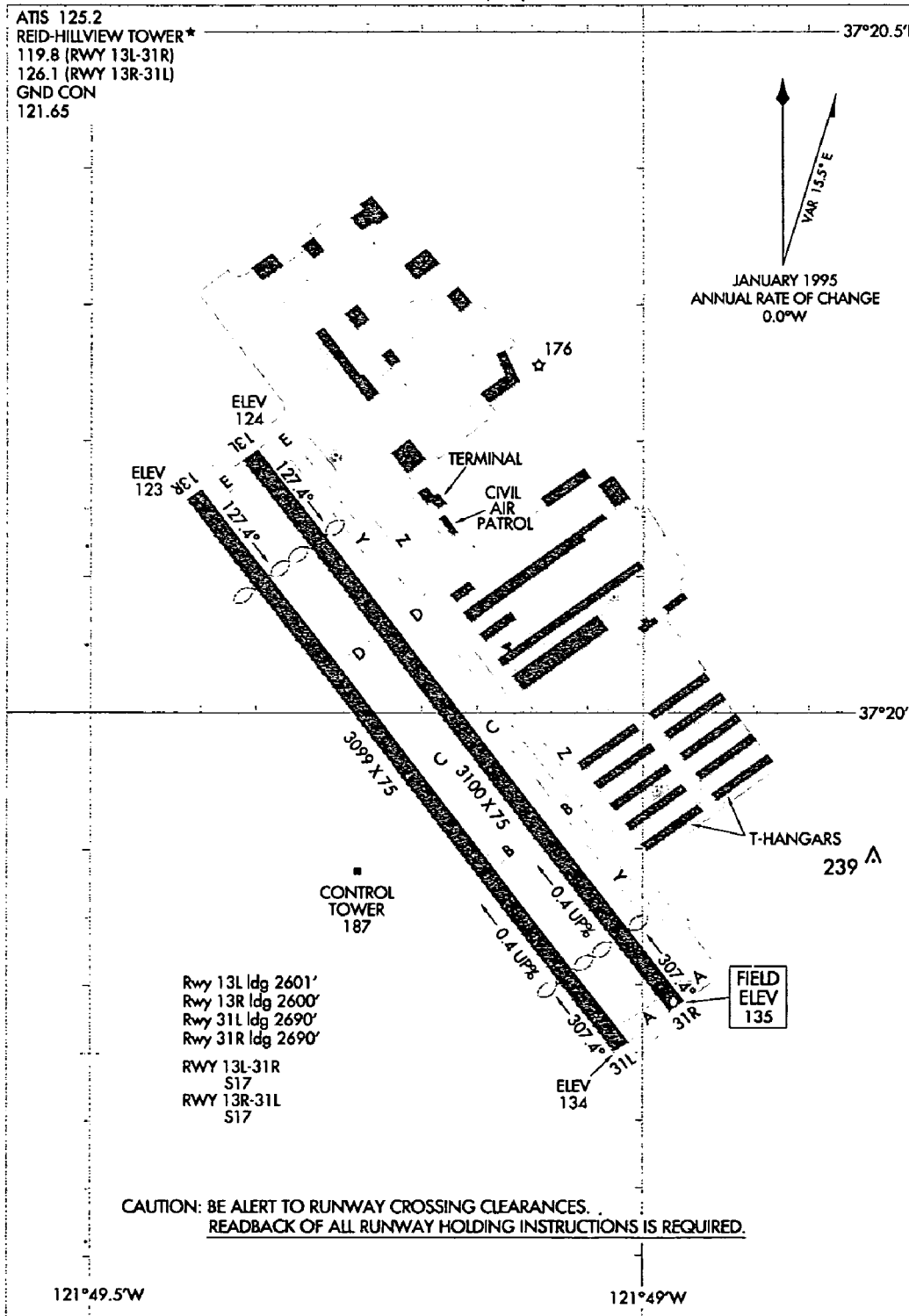

In the preferred embodiment, the airport diagram is a 'to scale' depiction of the airport that has coordinate information on it, and is enclosed in a rectangular bounding box. Examples of such diagrams are Airport Diagrams produced by the FAA as shown, without limitation, in FIGS. 1, 2, and 3, which are intended to be drawn to scale FAA airport diagrams of three different airports. These diagrams have coordinate lines that, as will be described in more detail below, will be used by onboard software, provided by an embodiment the present invention, to interpolate and extrapolate to determine a relatively accurate, if not exact, position on the airport. Each of FIGS. 1, 2, and 3 has certain representative characteristics that embodiments of the invention are intended to address. It is believed that virtually all airport diagrams have similar characteristics as either FIG. 1, 2, or, 3. It is contemplated, however, that the principles of the present invention is general enough to handle any variants. FIG. 1 shows the lines of latitude and longitude at an angle to the horizontal and vertical. As will be described below, embodiments of the present invention can handle any angle at which the lines of latitude and longitude are rotated. For example in FIG. 3 the lines of latitude and lines of longitude have been rotated 90° and the lines of latitude and longitude run vertically and horizontally respectively. FIG. 2 shows an airport diagram that only has a half of a degree between adjacent lines of latitude or longitude. Although the invention is described using the points at which the lines of latitude and longitude intersect with the bounding rectangular box, is should be appreciated that embodiments of the present invention works just as well with other suitable diagrams that have points located on the diagram that have coordinates associated with them. Examples of such diagrams are Airport Diagrams, Instrument Approach Charts, Instrument Departure Procedure Charts, Standard Terminal Arrival Route Chats, as well as many non-aviation-related charts.

Figure 4:
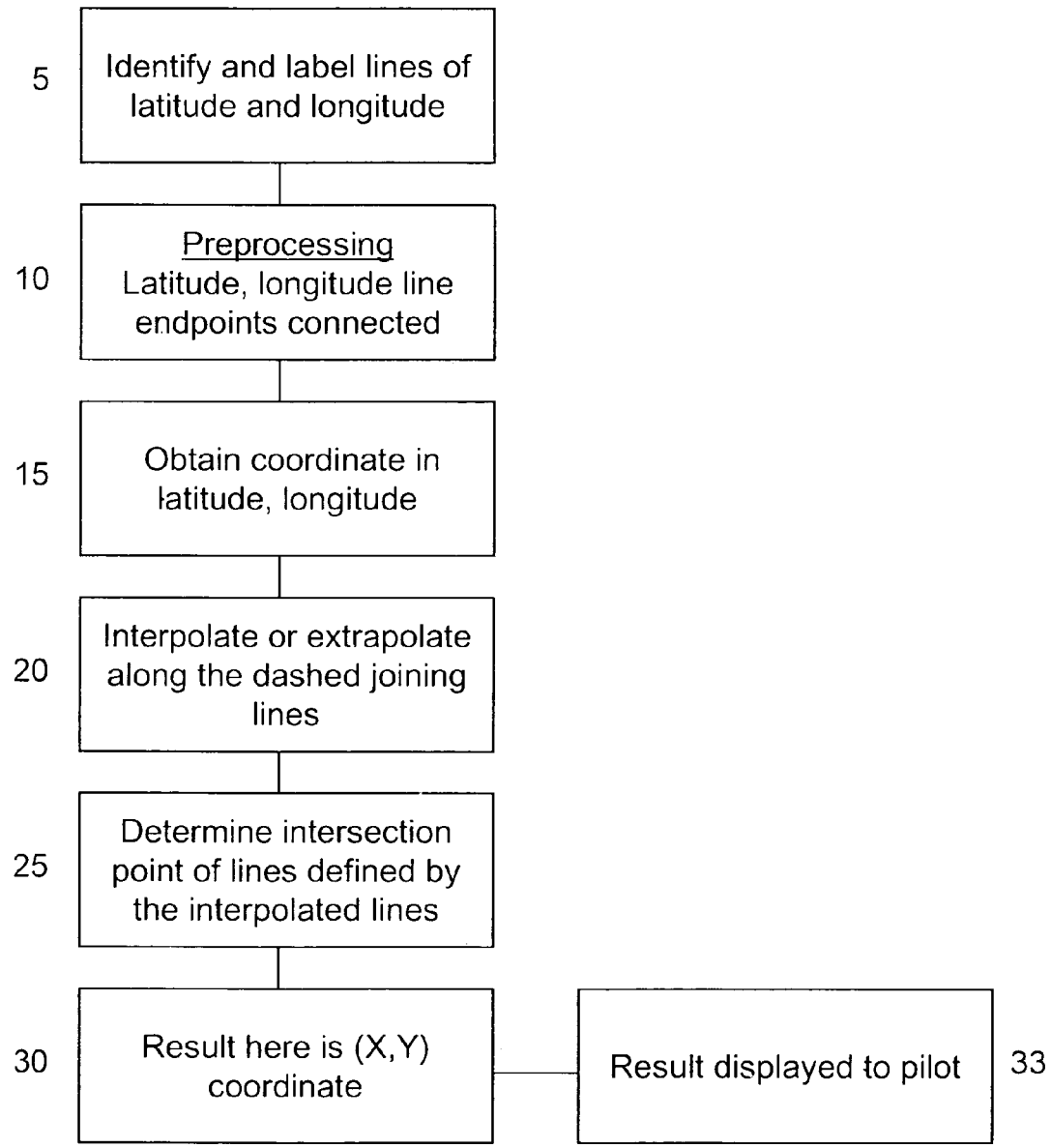
FIG. 4 is a flowchart diagram that illustrates an exemplary process for mapping the position of objects on an airport diagram, in accordance with an embodiment of the present invention.

FIG. 4 is a flowchart diagram that shows an exemplary process for mapping the position of objects on an airport diagram, in accordance with an embodiment of the present invention. In the present embodiment, the positioning process beings at Step 5, the pre-processing step. In Step 5, the intersection points of the lines of latitude and the lines of longitude within the bounding box of the airport diagram and defined. Defining these points in terms of percentages along the x-axis and y-axis of the image allows the algorithm to easily handle image scaling. In some embodiments, this pre-processing step may be a manual operation in which a user identifies the intersection points and labels them as a particular line of latitude or longitude. In alternate embodiments, this pre-processing step could be automated, perhaps by using techniques such as, but not limited to, Optical Character Recognition, Image Thinning, and Spline Fitting. In the present embodiment, it is only necessary to label two lines of latitude and two lines of longitude since, by using interpolation and extrapolation on these two lines, all points in the image are determinable. It is preferred to use the outer-most lines of latitude and lines of longitude since choosing these will reduce the interpolation/extrapolation errors if the intersection points are a pixel or two in error. However, if either or both of the outer-most lines are very short accuracy may be reduced and in that case an inner line might be preferable. In the present embodiment, Step 10 is to connect the ends of the two lines of latitude and two lines of longitude. This is done by joining the endpoints of the one line of latitude with the endpoints of the other line of latitude, and joining the endpoints of the one line of longitude with the endpoints of the other line of longitude. There are two ways of joining the endpoints; i.e. the endpoint of one line of latitude could go to either endpoint of the other line of latitude. However, since the present process requires interpolation/extrapolation between these joining lines, in the present embodiment, the joining lines of the lines of latitude are chosen as parallel as possible to each other and also for the lines of longitude. This will help ensure that the distance between the two joining lines will be as large as possible thereby increasing the accuracy of interpolation or extrapolation. Another contemplated way of interpolating and extrapolating include, without limitation, using surrounding lines of latitude and longitude to more accurately calculate the approximate a non-linear change in the latitude and longitude between successive lines of latitude and longitude respectively. In many applications, this approach would provide a more accurate approximation. Tests of the present embodiment have found that this level of accuracy unnecessary, however, in areas where the lines of latitude and/or longitude are changing rapidly and non-uniformly, wherein non-linear interpolation and extrapolation would perhaps be more accurate.

An aspect of the present embodiment of the invention is to map a GPS coordinate onto a position image on the airport diagram. This position may be in the integer domain such as pixel coordinates in an image, or they may be in the real number domain that is suitable for resizing, rotating, and other image manipulation operations, such as, but not limited to, image warping and image projections. The process of mapping the position is begun at Step 15 where the latitude and longitude coordinates of the object being mapped are obtained with an instrument such as, but not limited to a GPS receiver. In light of the teachings of the present invention, those skilled in the art will recognize a plurality of systems able to provide relatively accurate latitude and longitude coordinates to the system such as, but not limited to, Internal Navigation Systems (INS) or Automatic Dependent Surveillance (ADS-B). Many commercial airplanes are equipped with INS, which are capable of calculating accurate coordinates, and ADS-B can provide the present system with the coordinates of other vehicles. However, a GPS receiver is used in the present embodiment, at least because it is currently less costly than these other systems. The next step of the present embodiment is Step 20 in which the position of the object is interpolate or extrapolated along the connecting lines. By associating these intersection points with lines of latitude land longitude, a set of points can be constructed from which a point on the diagram can be calculated by using interpolation or extrapolation. It should be noted that due to the relatively small distances involved, airport size versus earth size, linear interpolation and linear extrapolation is used without introducing significant error in the present embodiment. However, for increased accuracy, non-linear approaches such as, without limitation, great circle calculations may be used. Great circle routes are curved lines that cater for the curvature of the earth. A great circle route has a true course that varies from point to point. Therefore the joining lines would effectively be curves, thereby making the calculations more complex, but the results would be more accurate. In the present embodiment, Step 25 is to determine the intersection point of the lines defined by the interpolated or extrapolated points. The result is obtained as an (X,Y) coordinate, shown as Step 30, and, in Step 33, is displayed to the pilot. In the present embodiment, the airport diagram and position icon may be displayed on a device such as, but not limited to, a Pocket PC, Palm, Table PC or EFB. The displayed icon may be designed to represent any desired symbol, including, but not limited to, resembling the vehicle it is mapping. In some embodiments, the position may also be communicated by other sensory modes, including, an audio cue. The present embodiment is orientation-neutral; the diagram it is mapped onto does not have to be "north up". The present system may rotate the image to tract up if required by the pilot and as long as all of the appropriate points are rotated as well. The system may also rotate the image away from the viewer in such as way that it appears to be 3D. This would be similar to laying a map on a table and looking down on it from an angle.

Figure 5:
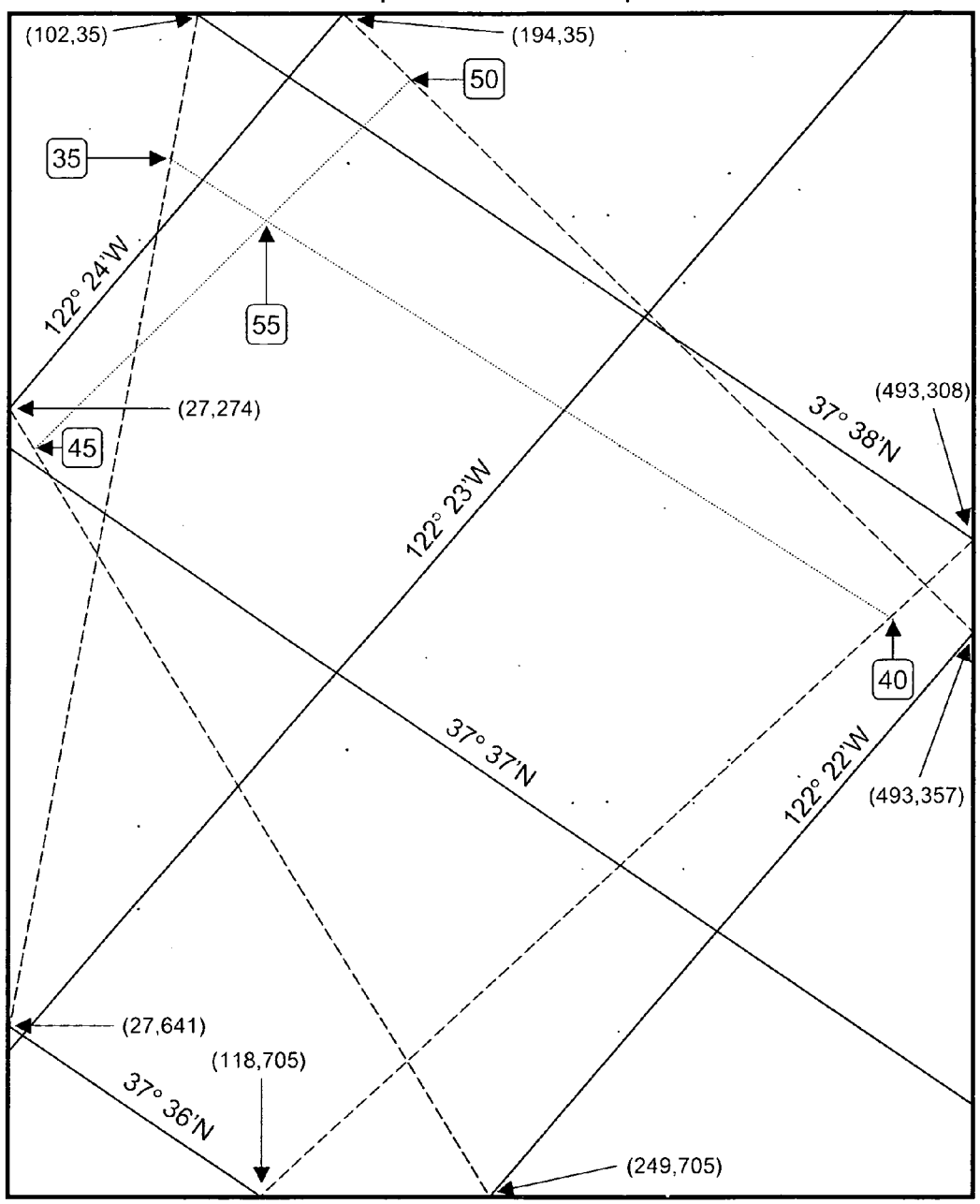
FIG. 5 illustrates exemplary geometrical calculations to determine an accurate position on an airport diagram, in accordance with an embodiment of the present invention.

FIG. 5 illustrates exemplary geometrical calculations to determine an accurate position on the airport diagram, in accordance with an embodiment of the present invention. In the present example, the pre-processing step, Step 5 in FIG. 1, has identified the points at (102, 35) and (493, 308) defining the 37° 38'N. line of latitude, and (27, 641) and (118, 705) defining the 37° 36'N. line of latitude. Similarly, (27, 264) and (194, 35) define the 122° 24'W. line of longitude and (249, 705) and (493, 357) define the 122° 22'W. line of longitude. In the present embodiment, the two outer most lines of latitude and lines of longitude were chosen to reduce interpolation/extrapolation errors as mentioned in FIG. 1. The end points of the chosen latitude and longitude lines are then connected. Dashed lines are drawn to join these endpoints for illustration purposes. For either the lines of latitude or lines of longitude, two joining lines are possible; the dashed line can be drawn from one end of one of the lines of latitude to either of the other lines's ends. 37° 37'N. and 122° 23'W. were not used for reasons explained above. In the present embodiment, the lines are chosen such that the angle made by the joining lines or their extensions is as close to zero as possible. Parallel joining lines would be optimal in many applications to improve accuracy since by using parallel lines the intermediate points are kept further apart, thereby improving accuracy. In the present example, the latitude and longitude coordinates obtained from the GPS receiver for the object to be mapped are 37° 37.724122'N. and 122° 23.603360'W. respectively. The latitude is mapped to a position on both dashed latitude joining lines. In the present case, since the lines of latitude are 37° 36'N. and 37° 38'N., the latitude 37° 37.724122'N. lies mostly toward the 37° 38'N. line, which implements linear interpolation, by way of example, and not limitation as alternative embodiments may implement non-linear interpolation, depending upon the needs of the particular application. These two points, shown as points 35 and 40, define an interpolated line of latitude as depicted by the dotted line that joins points 35 and 40. Similarly, using linear interpolation 122° 23.603360'W. is mapped onto points 45 and 50 lying on the joining lines of longitude. Points 45 and 50 define an interpolated line of longitude as depicted by the dotted line that joins points 45 and 50. The intersection of the two interpolated lines, shown as dotted lines, define the point on the image being mapped from the GPS coordinate onto the image as depicted by point 55. The point on the diagram may be a real point, for example, without limitation, a pixel, or it may be a virtual point thereby allowing for scaling at a later time. A real point is applicable to airport diagram images that are defined using pixels, and a virtual point is applicable to airport diagrams that are defined using a vector format. In the present embodiment, the image is not necessary north up. This makes no difference since the process is not dependant on orientation as long as the lines of latitude and lines of longitude are accurately defined as described above.

Figure 3:
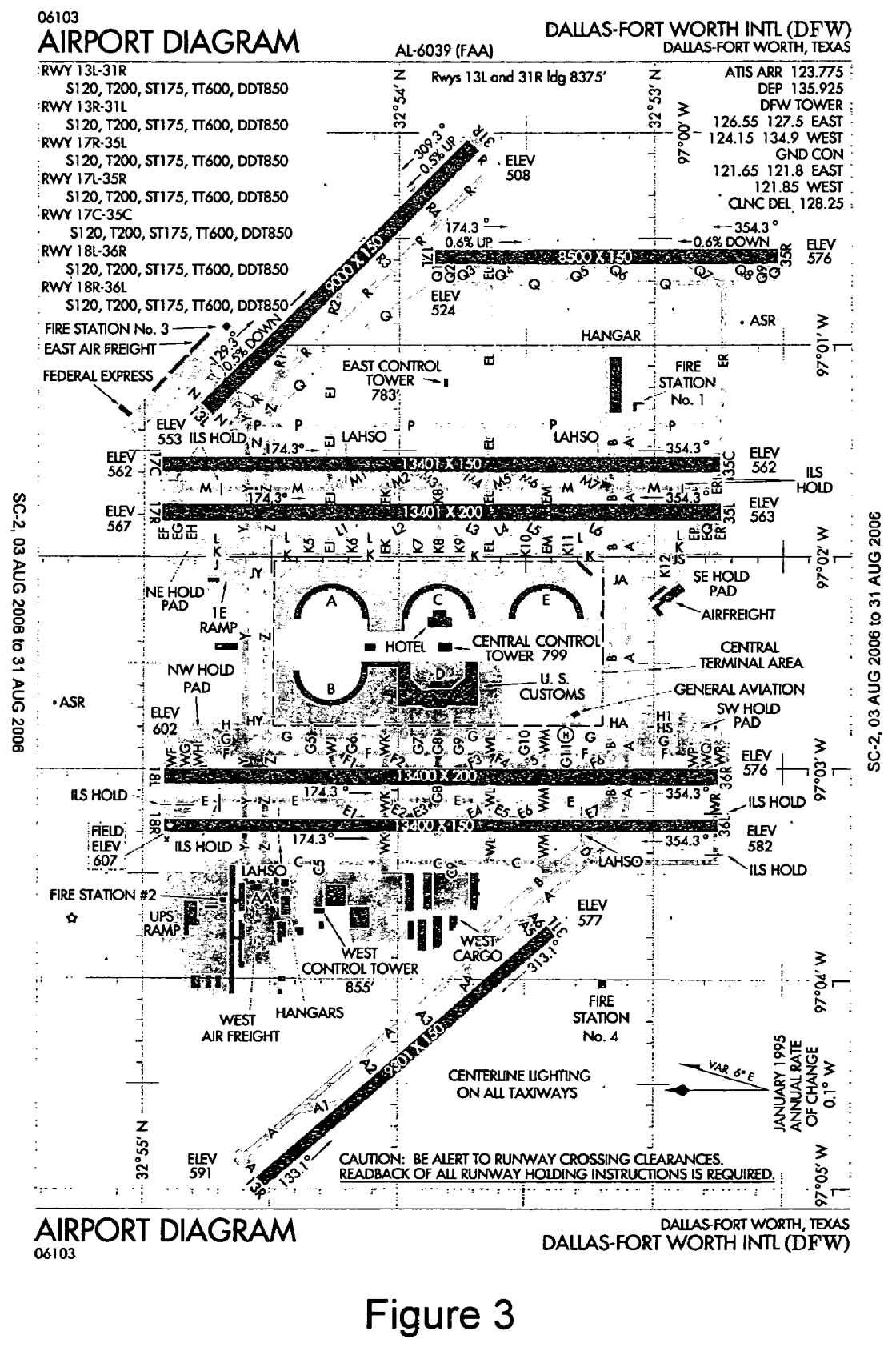

Referring again to FIGS. 1, 2, and 3, and with further reference to FIGS. 1 and 2, some exemplary implementation details will next be discussed in some detail. FIG. 1 is a taxi diagram of San Francisco International Airport. FIG. 2 is a taxi diagram of Reid-Hillview Airport. FIG. 3 is a taxi diagram of Dallas-Fort Worth International Airport. FIGS. 1, 2, and 3 have lines of latitude and lines of longitude that run from one edge of the enclosing rectangle to a different edge. In some cases, the lines of latitude and longitude are drawn horizontally and vertically respectively as in FIG. 2. In some cases, said lines may be rotated as in FIG. 1. The amount of rotation is arbitrary and is set by the creators of the images. The coordinates used in the example calculations shown in FIG. 5, 37° 37.724211'N. and 122° 23.603360'W., are the actual coordinates of San Francisco's (SFO) Runway 10L threshold, illustrated in FIG. 1. It can be seen from FIG. 1 that the example illustrated in FIG. 5 correctly maps runway 10L's threshold on the image; the runway 10L threshold collates with the calculated point 55 in FIG. 5.

In some embodiments, pilots may use the present system as an aid in viewing taxiway naming. This application would be particularly useful in airports that do not have well-maintained signage, missing signage, bad lighting, or in low or zero visibility conditions. The present invention would aid the pilot in determining upcoming taxiways, runways, and other ground reference points, such as, but not limited to, high-alert areas, terminal gates, hold-short lines, ILS Critical Areas, runup areas, businesses such as flight schools and Jet Centers. The airport diagrams, as shown in FIGS. 1, 2, and 3, have the taxiway lettering right on the image, so a pilot may look at the device to see where he/she is, what taxiway or runway they are on, and what taxiway/runway they are approaching. By using pre-defined taxiway coordinates, the present embodiment system could display taxiways together with the appropriate lettering.

In some other embodiments of the present invention, the foregoing teachings are adapted to show gate location. Gate locations for major airports are published, given in latitude and longitude coordinates. By using the gate's coordinates, the present embodiment would be able to show a pilot where the gate is on the airport diagram with a relatively high degree of accuracy. Since the present embodiment maps such coordinates onto the airport diagram image, the gate's location can be depicted directly on the airport diagram image. Also, in some alternate embodiments, using the vehicle's position and the gate's position, the present system could determine the best route to the gate using runway and taxiway information. To accomplish this alternate embodiment, the software for the present system may store the location of the taxiways, and together with public gate coordinate information, the software could determine the shortest distance to the gate. In alternate embodiments, the pilot could enter the ATC instruction to taxi to the gate. For example, "United 123, taxi to Gate 42 via taxiways Alpha, Mike, Yankee". By using pre-defined taxiway coordinates, the route could be determined and visually displayed using the present invention. In yet other embodiments, a warning/signaling device, such as, but not limited to, an audible alarm or flashing light may also be activated if the vehicle deviates from the ATC instructions. The software may store the location of the taxiways, and highlight the desired route. By using simple math known to those skilled in the art, the software could also determine when the aircraft's position deviated sufficiently from the taxiway's centerline to warn the pilot.

In some alternate embodiments of the present invention, the system may also be configured to inform the pilot, for example, where the hold short locations for ILS, CAT 1, CAT 2, Cat 3, etc are. In low or zero visibility conditions, it is critical for aircraft to hold short, or stop before, various points on the airport as not to interfere with radio signals of the Instrument Landing System (ILS). By storing the latitude and longitude coordinates of the location of the hold short points, embodiments of the present invention would be able to visually display the hold short location directly on the airport diagram image or notify the vehicle operator with an alert, such as, but not limited to an alarm or flashing light, when they are approaching this point, or have passed it.

In some embodiments of the present invention, the location of other vehicles is mapped on the airport diagram. Automatic Dependent Surveillance (ADS-B) equipped vehicles broadcast their GPS location for other vehicles to detect. By using this informaiton, the present embodiment may map the location of other vehicles using the same method as described in the preferred embodiment for mapping runway position. These positions can also be displayed on the airport diagram with an "other vehicle" icon. This allows the pilot to quickly see where other aircraft on the airport are. In addition, a device could also be used in the Air Traffic Control tower allowing the controllers to see where all the planes are on the airport.

In yet other embodiments of the present invention, a Digital Automatic Terminal Information Service (D-ATIS) or manual input from the voice ATIS service is used to highlight active runway(s). Together with the position of the aircraft as shown on the airport diagram, this adds to a pilot's situational awareness of their proximity to the active runway(s). The present system may, from obtaining the digitally encoded D-ATIS, determine which runway is in use, called the "active runway". Then, using its database of runways for the airport, obtain the active runway's latitude and longitude coordinates for its two endpoints. The invention as described above would map these two endpoints onto the diagram and some form of highlighting shown between the two endpoints to warn the pilot that that runway is the active runway.

Those skilled in the art will readily recognize, in accordance with the teachings of the present invention, that any of the foregoing steps may be suitably replaced, reordered, removed and additional steps and may be inserted depending upon the needs of the particular application, and that the systems described in any of the foregoing embodiments may be implemented using any of a wide variety of suitable processes, and is not limited to any particular computer hardware, software, firmware, microcode and the like.

Figure 6:
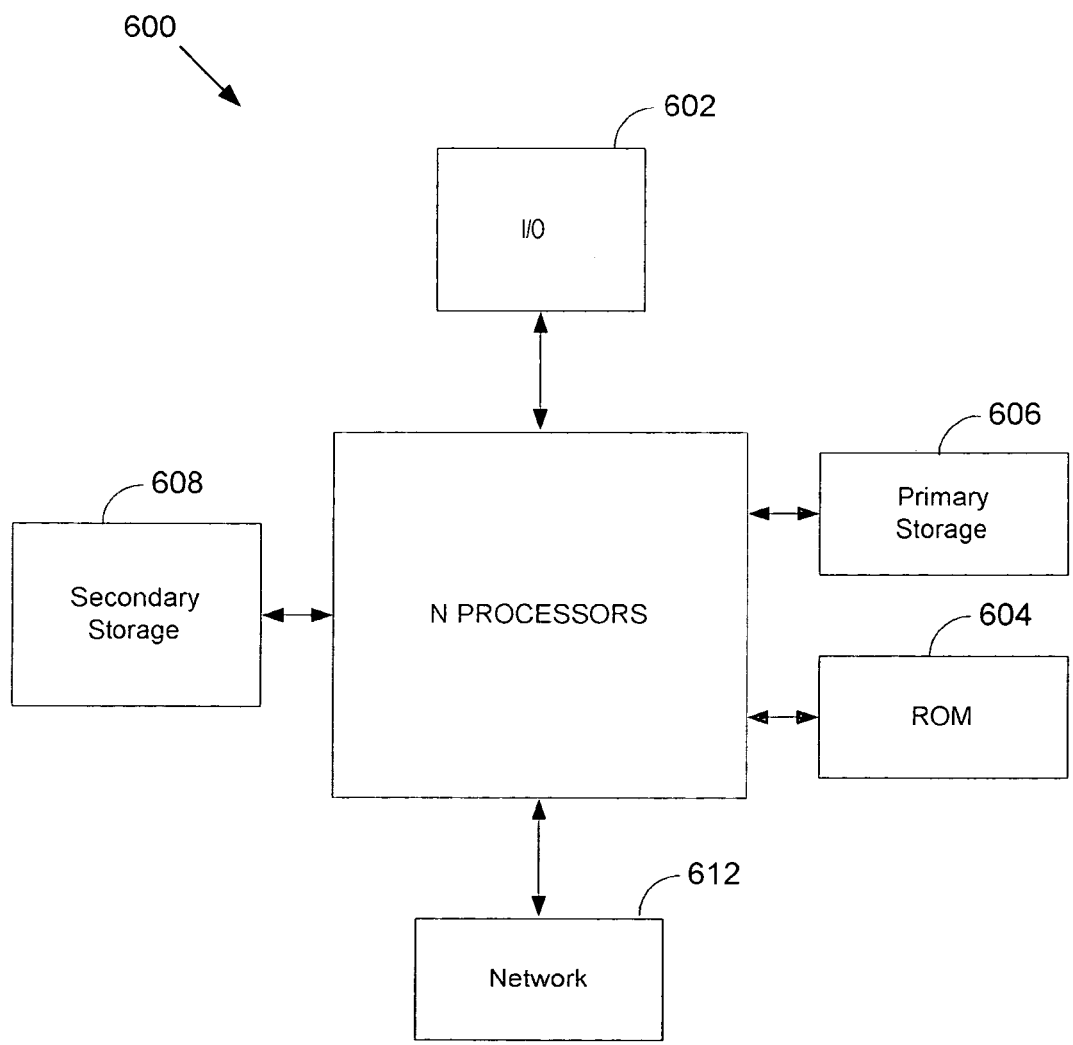
FIG. 6 illustrates a typical computer system that, when appropriately configured or designed, can serve as a computer system in which the invention may be embodied.

FIG. 6 illustrates a typical computer system that, when appropriately configured or designed, can serve as a computer system in which the invention may be embodied. The computer system 600 includes any number of processors 602 (also referred to as central processing units, or CPUs) that are coupled to storage devices including primary storage 606 (typically a random access memory, or RAM), primary storage 604 (typically a read only memory, or ROM). CPU 602 may be of various types including microcontrollers and microprocessors such as programmable devices (e.g., CPLDs and FPGAs) and unprogrammable devices such as gate array ASICs or general purpose microprocessors. As is well known in the art, primary storage 604 acts to transfer data and instructions uni-directionally to the CPU and primary storage 606 is used typically to transfer data and instructions in a bi-directional manner. Both of these primary storage devices may include any suitable computer-readable media such as those described above. A mass storage device 608 may also be coupled bi-directionally to CPU 602 and provides additional data storage capacity and may include any of the computer-readable media described above. Mass storage device 608 may be used to store programs, data and the like and is typically a secondary storage medium such as a hard disk. It will be appreciated that the information retained within the mass storage device 608, may, in appropriate cases, be incorporated in standard fashion as part of primary storage 606 as virtual memory. A specific mass storage device such as a CD-ROM 614 may also pass data uni-directionally to the CPU.

CPU 602 may also be coupled to an interface 610 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 602 optionally may be coupled to an external device such as a database or a computer or telecommunications or internet network using an external connection as shown generally at 612. With such a connection, it is contemplated that the CPU might receive information from the network, or might output information to the network in the course of performing the method steps described herein.

Having fully described at least one embodiment of the present invention, other equivalent or alternative methods for coordinate mapping onto airport diagrams according to the present invention will be apparent to those skilled in the art. The invention has been described above by way of illustration, and the specific embodiments disclosed are not intended to limit the invention to the particular forms disclosed. For example, although the foregoing embodiments were directed to airport map applications, it is contemplated that the present invention may be readily configured to suitably work in a multiplicity of other applications that are mapped and have defined lines of latitude and longitude, including, without limitation, harbors, sea nagivation, game reserves, hiking trails, race tracks, and etc. The invention is thus to cover all modifications, equivalents, and alternatives falling within the spirit and scope of the following claims.

What is claimed is:

1. A method of mapping a latitude/longitude point, the method comprising the Steps of:
    identifying a bounded diagram having latitude and longitude points;
    identifying at least two lines of latitude contained within said bounded diagram;
    identifying at least two lines of longitude contained within said bounded diagram;
    determining intersection points of said lines of latitude and said lines of longitude with the boundary of said bounded diagram;
    determining at least two latitude connecting lines from said intersection points such that each of said latitude connecting lines intersects two lines of latitude;
    determining at least two longitude connecting lines from said intersection points such that each of said longitude connecting lines intersects two lines of longitude;
    obtaining a latitude coordinate of the latitude/longitude point;
    determining latitude points corresponding to said latitude coordinate along each of said latitude connecting lines;
    determining a latitude position line determined by said latitude points;
    obtaining a longitude coordinate of the latitude/longitude point;
    determining longitude points corresponding to said longitude coordinate along each of said longitude connecting lines;
    determining a longitude position line determined by said longitude points;
    determining an intersection point of said latitude position line and said longitude position line; and
    placing an object representing the latitude/longitude point at said intersection point.

2. The method as recited in claim 1 wherein said bounded diagram is an airport diagram.

3. The method as recited in claim 1 wherein the step of determining said latitude points and said longitude points comprises the use of non-linear calculations.

4. The method as recited in claim 1, further comprising the Step of image processing said bounded diagram and said object.

5. The method as recited in claim 1, in which a plurality of latitude/longitude points are mapped.

6. The method as recited in claim 1, further comprising the Step of initiating an alarm in association with the Step of placing said object.

7. A computer program product for mapping a latitude/longitude point, the computer program residing on a computer readable medium having a plurality of instructions stored thereon which, when executed by a processor, cause that processor to:
    identify a bounded diagram having latitude and longitude points;
    identify at least two lines of latitude contained within said bounded diagram;
    a means for identifying at least two lines of longitude contained within said bounded diagram;
    determine intersection points of said lines of latitude and said lines of longitude with the boundary of said bounded diagram;
    determine at least two latitude connecting lines from said intersection points such that each of said latitude connecting lines intersects two lines of latitude;
    determine at least two longitude connecting lines from said intersection points such that each of said longitude connecting lines intersects two lines of longitude;
    obtain a latitude coordinate of the latitude/longitude point;
    determine latitude points corresponding to said latitude coordinate along each of said latitude connecting lines;
    determine a latitude position line determined by said latitude points;
    obtain a longitude coordinate of the latitude/longitude point;
    determine longitude points corresponding to said longitude coordinate along each of said longitude connecting lines;
    determine a longitude position line determined by said longitude points;
    determine an intersection point of said latitude position line and said longitude position line; and
    placing an object representing the latitude/longitude point at said intersection point.

8. The computer program product as recited in claim 7 wherein said bounded diagram is an airport diagram.

9. The computer program product as recited in claim 8 further comprising instructions that cause the processor to enable interfacing with an airport's D-ATIS.

10. The computer program product as recited in claim 7 wherein said determining of said latitude points and said longitude points uses non-linear calculations.

11. The computer program product as recited in claim 7 further comprising instructions that cause the processor to perform image processing on said bounded diagram and said object.

12. The computer program product as recited in claim 7 wherein multiple latitude/longitude points are mapped.

13. The computer program product as recited in claim 7 further comprising instructions that cause the processor to initiate an alarm in association with placing said object.

14. A system for mapping a latitude/longitude point, the system comprising:
- a processor identifying a bounded diagram having latitude and longitude points;
- a latitude processor identifying at least two lines of latitude contained within said bounded diagram;
- a longitude processor identifying at least two lines of longitude contained within said bounded diagram;
- a boundary processor determining intersection points of said lines of latitude and said lines of longitude with the boundary of said bounded diagram;
- a latitude connecting processor determining at least two latitude connecting lines from said intersection points such that each of said latitude connecting lines intersects two lines of latitude;
- a longitude connecting processor determining at least two longitude connecting lines from said intersection points such that each of said longitude connecting lines intersects two lines of longitude;
- an latitude input device obtaining a latitude coordinate of the latitude/longitude point;
- a latitude point processor determining latitude points corresponding to said latitude coordinate along each of said latitude connecting lines;
- a latitude line processor determining a latitude position line determined by said latitude points;
- a longitude input device obtaining a longitude coordinate of the latitude/longitude point;
- a longitude point processor determining longitude points corresponding to said longitude coordinate along each of said longitude connecting lines;
- a longitude line processor determining a longitude position line determined by said longitude points;
- an intersection processor determining an intersection point of said latitude position line and said longitude position line; and
- a display processor placing an object representing the latitude/longitude point at said intersection point.

15. The system as recited in claim 14 wherein said bounded diagram is an airport diagram.

16. The system as recited in claim 15, further comprising an interface between said system and an airport's D-ATIS.

17. The system as recited in claim 14 wherein said latitude point processor and said longitude point processor uses non-linear calculations.

18. The system as recited in claim 14 further including an image processor processing said bounded diagram and said object.

19. The system as recited in claim 14 wherein multiple latitude/longitude points are mapped.

20. The system as recited in claim 14 wherein placing said object initiates an alarm.

* * * * *